Aug. 11, 1936.   H. C. SUMNER ET AL   2,050,475
COIN FREED OR OPERATED VENDING MACHINE
Filed Feb. 1, 1933   8 Sheets-Sheet 1

INVENTORS
H. C. SUMNER, F. J. TAYLOR
FRANK LANGLEY
BY Barker & Colling
ATTORNEYS

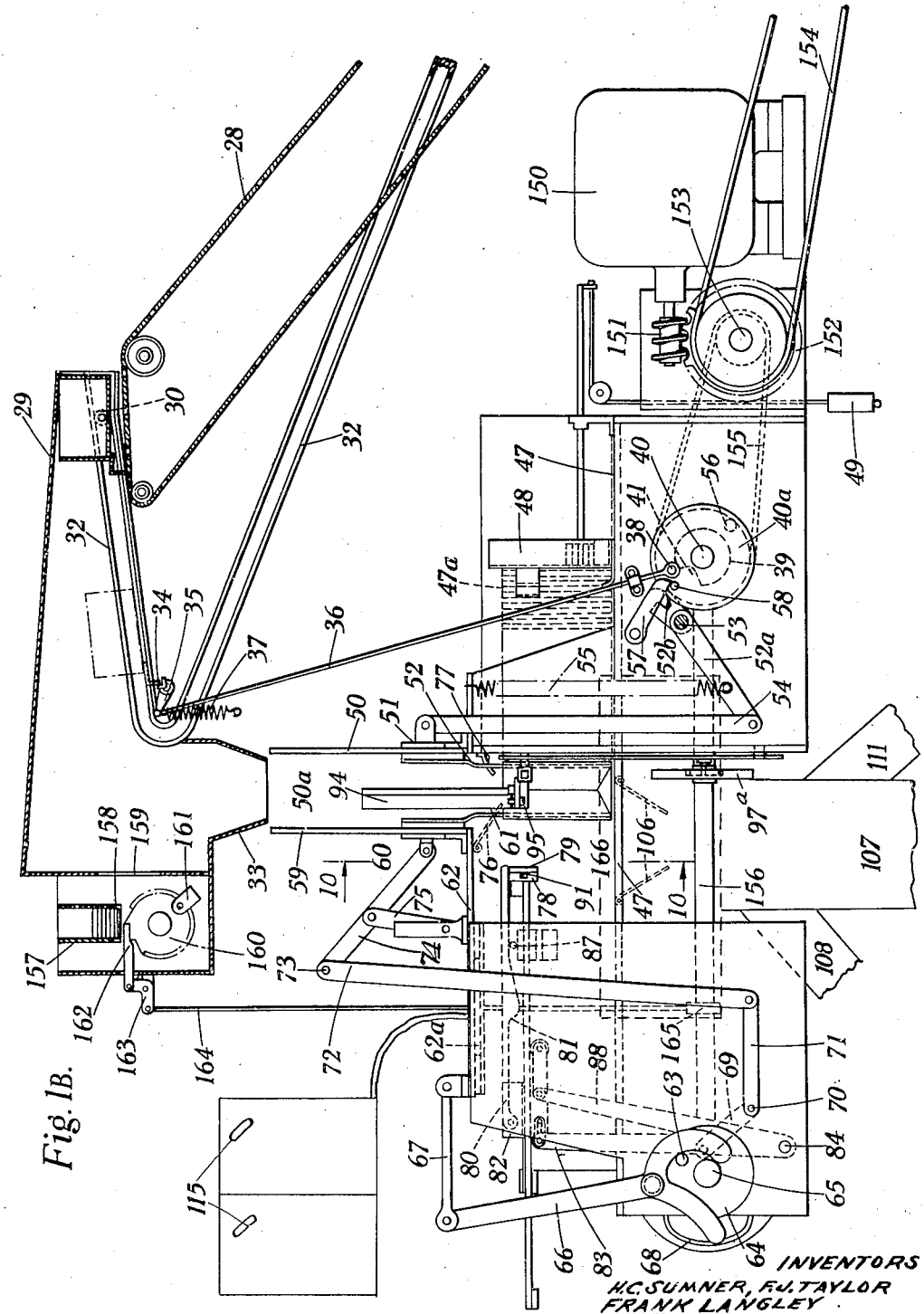

INVENTORS
H. C. SUMNER, F. J. TAYLOR
FRANK LANGLEY
BY
Barker & Collings
ATTORNEYS

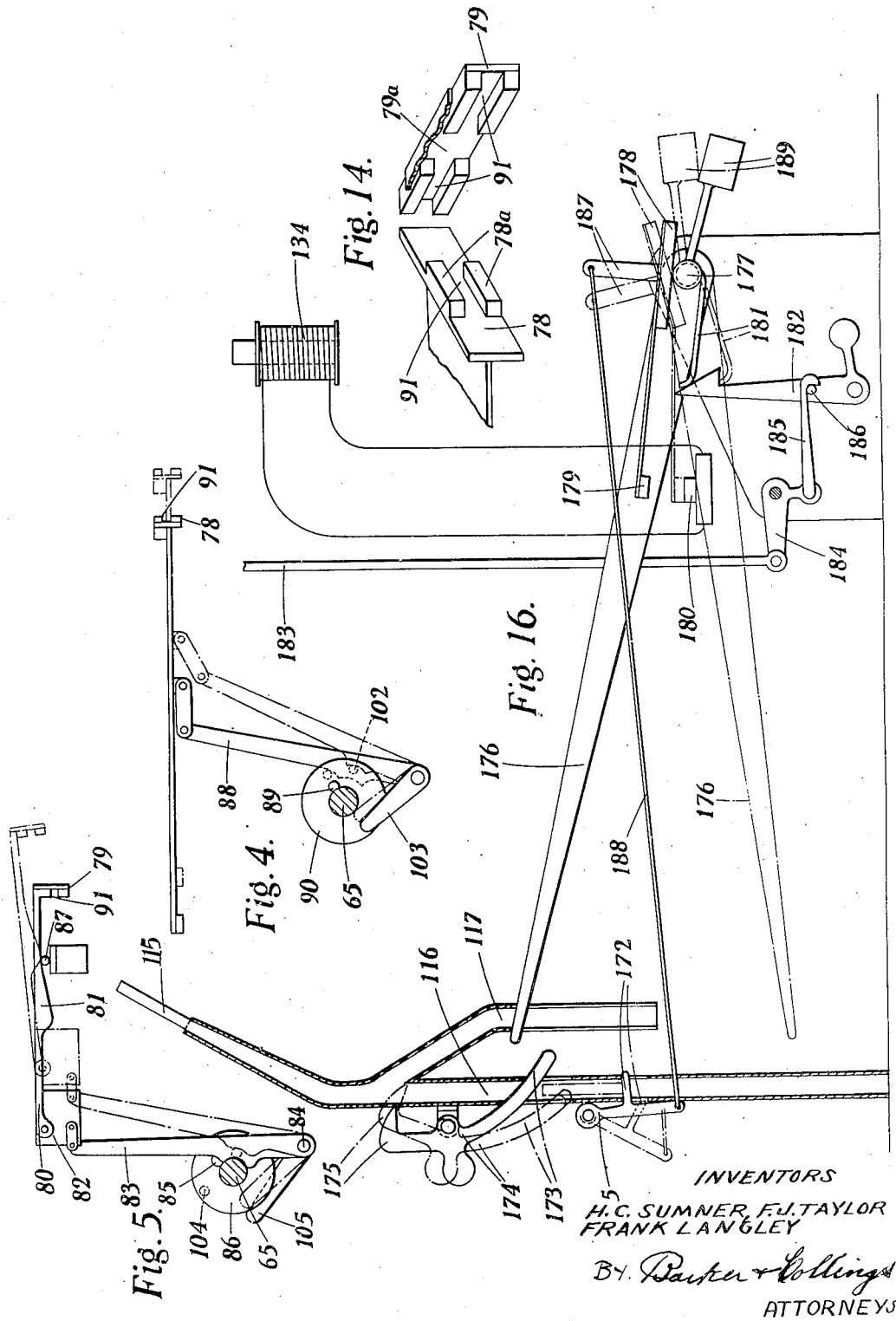

Aug. 11, 1936. H. C. SUMNER ET AL 2,050,475
COIN FREED OR OPERATED VENDING MACHINE
Filed Feb. 1, 1933 8 Sheets-Sheet 6

INVENTORS
H.C. SUMNER, F.J. TAYLOR
FRANK LANGLEY

ATTORNEYS.

Aug. 11, 1936.   H. C. SUMNER ET AL   2,050,475
COIN FREED OR OPERATED VENDING MACHINE
Filed Feb. 1, 1933    8 Sheets-Sheet 7
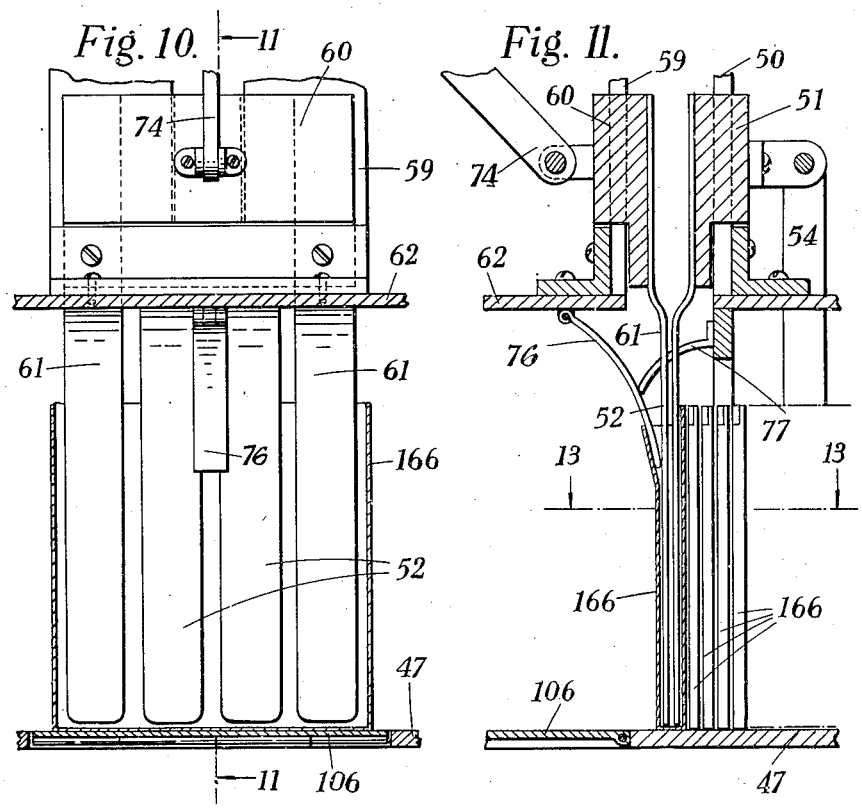
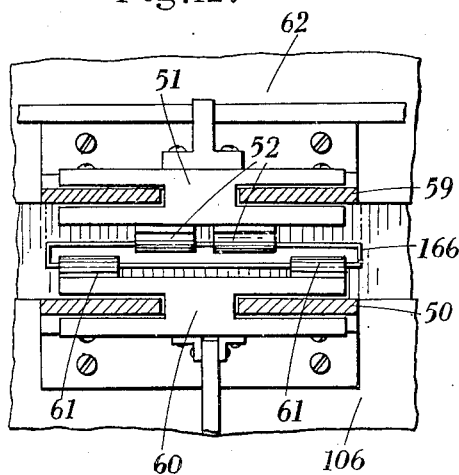
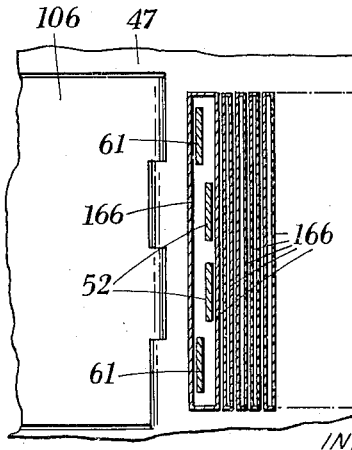
INVENTORS
H. C. SUMNER, F. J. TAYLOR
FRANK LANGLEY
BY
ATTORNEYS Aug. 11, 1936.  H. C. SUMNER ET AL  2,050,475
COIN FREED OR OPERATED VENDING MACHINE
Filed Feb. 1, 1933  8 Sheets-Sheet 8
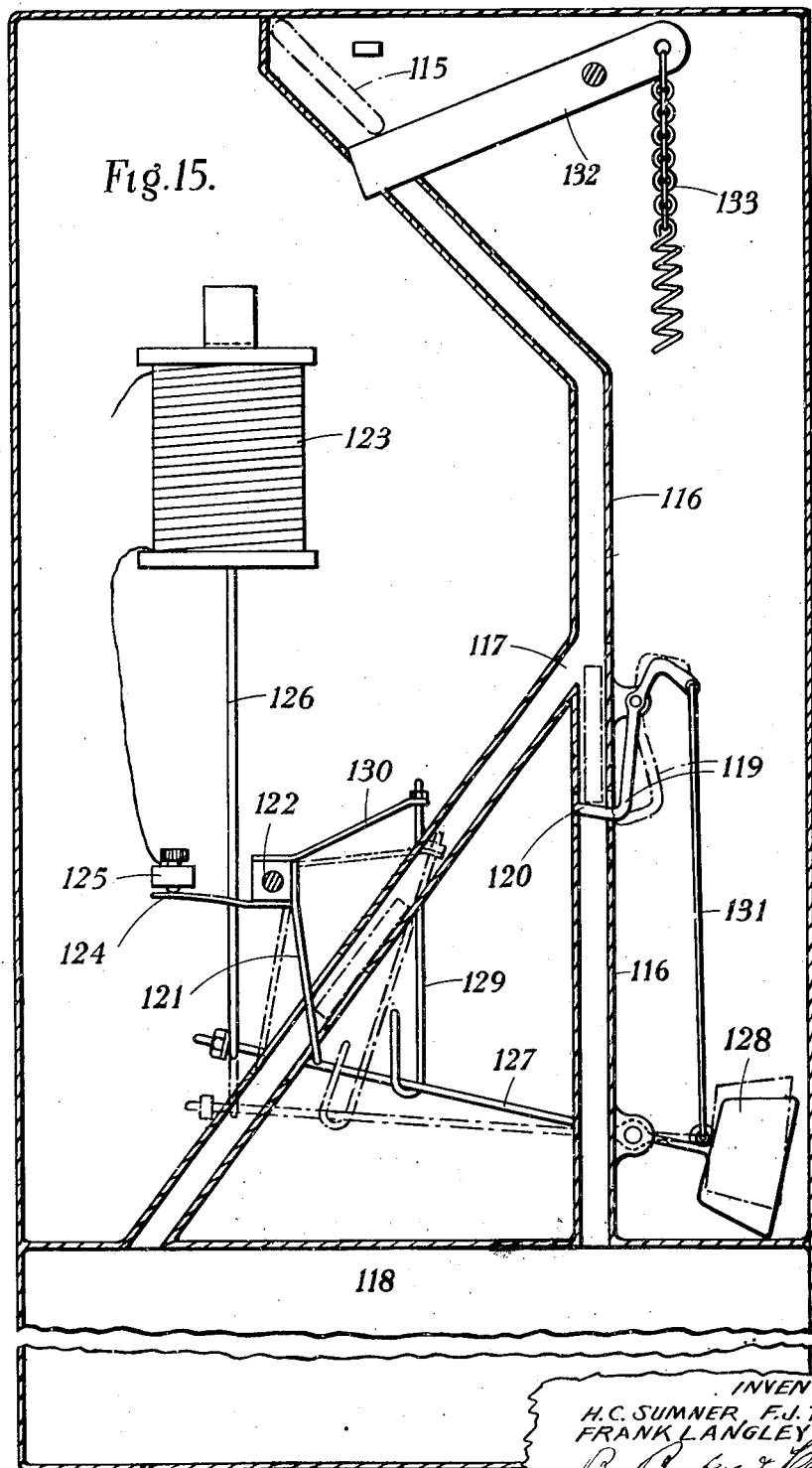

Patented Aug. 11, 1936

2,050,475

UNITED STATES PATENT OFFICE 2,050,475

COIN-FREED OR OPERATED VENDING MACHINE

Henry Cecil Sumner, Wyberton, and Frederick John Taylor and Frank Langley, Kirton, England Application February 1, 1933, Serial No. 654,740
In Great Britain February 2, 1932

10 Claims. (Cl. 53—7)

This invention is for a coin-freed or operated vending machine and has for an object to provide a machine which will pack and deliver vendible goods upon the insertion of a coin. Another object is to provide a vending machine for edible products or foodstuff that will cook or heat said goods prior to sale. A further object is to provide a machine having a plurality of vending positions but which, upon the insertion of a coin at any selected position will only deliver the goods to that position, while a still further object of the invention is to provide improved packing mechanism in a coin-freed or operated vending machine.

These and other objects are achieved by the construction of the machine illustrated in the accompanying drawings, in which Figures 1A and 1B show, in sectional elevation, contiguous portions of the machine.

Figures 4 and 5 are details showing in elevation certain mechanism of Figure 1B.

Figure 10 is a vertical section on line 10—10 of Figure 1B.

Figure 11 is a section on line 11—11 of Figure 10.

Figure 12 is a plan of Figure 10.

Figure 13 is a sectional plan on line 13—13 of Figure 11.

Figure 14 is an enlarged perspective view of the bag-closing dies.

Figure 15 shows on an enlarged scale a coin chute and associated mechanism.

Figure 16 shows also on an enlarged scale a modification of the coin chute and associated mechanism.

Throughout this description like reference numerals indicate like parts.

Figure 1A:
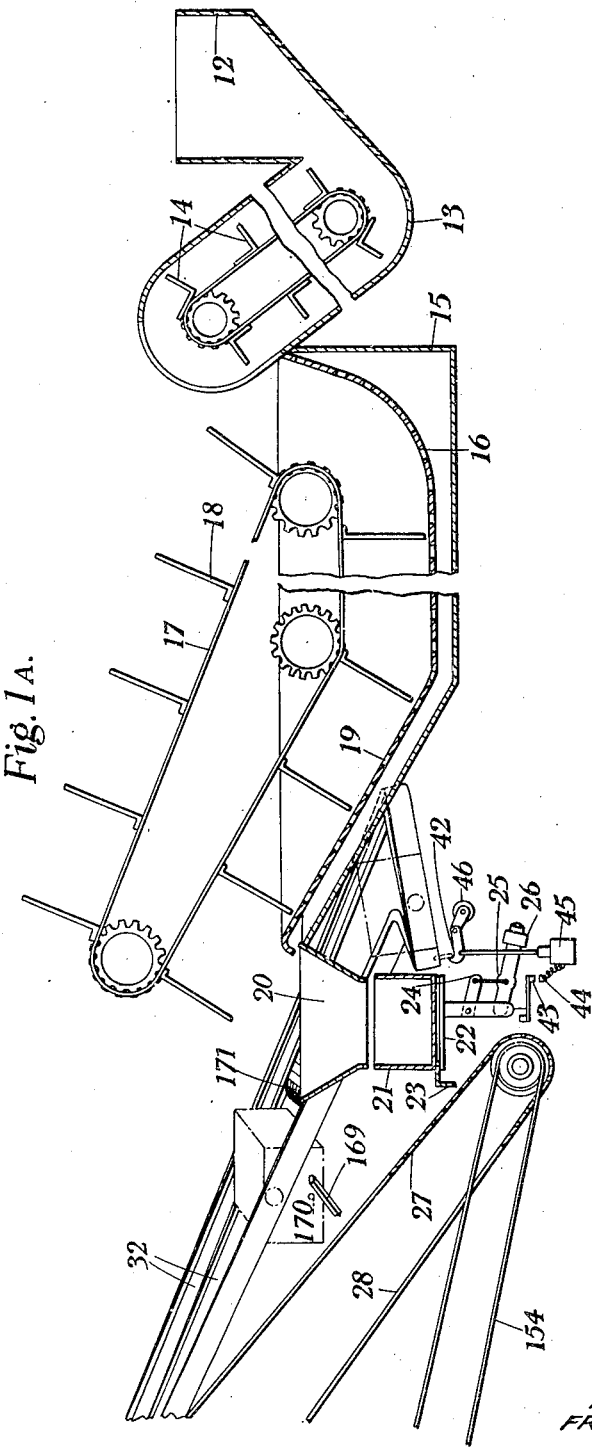
Figure 17:
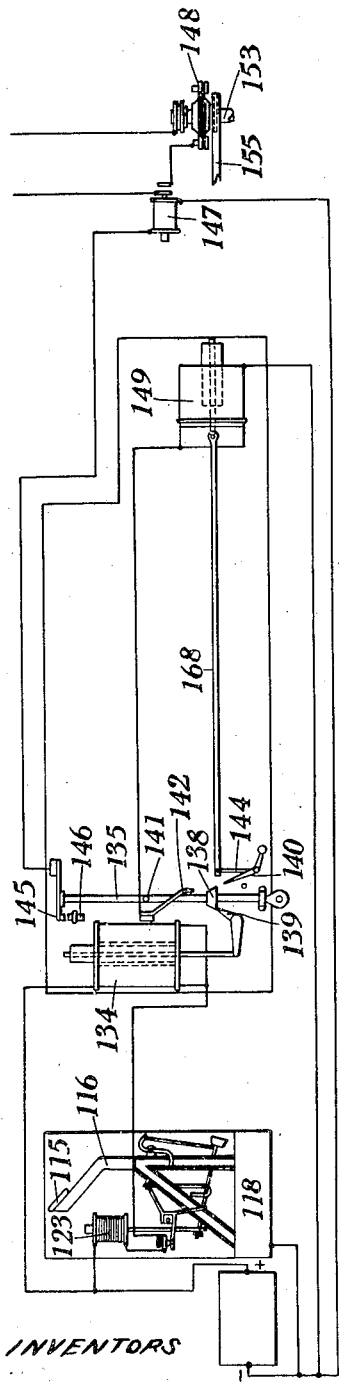
Figure 17 is a wiring diagram.
Figure 2:
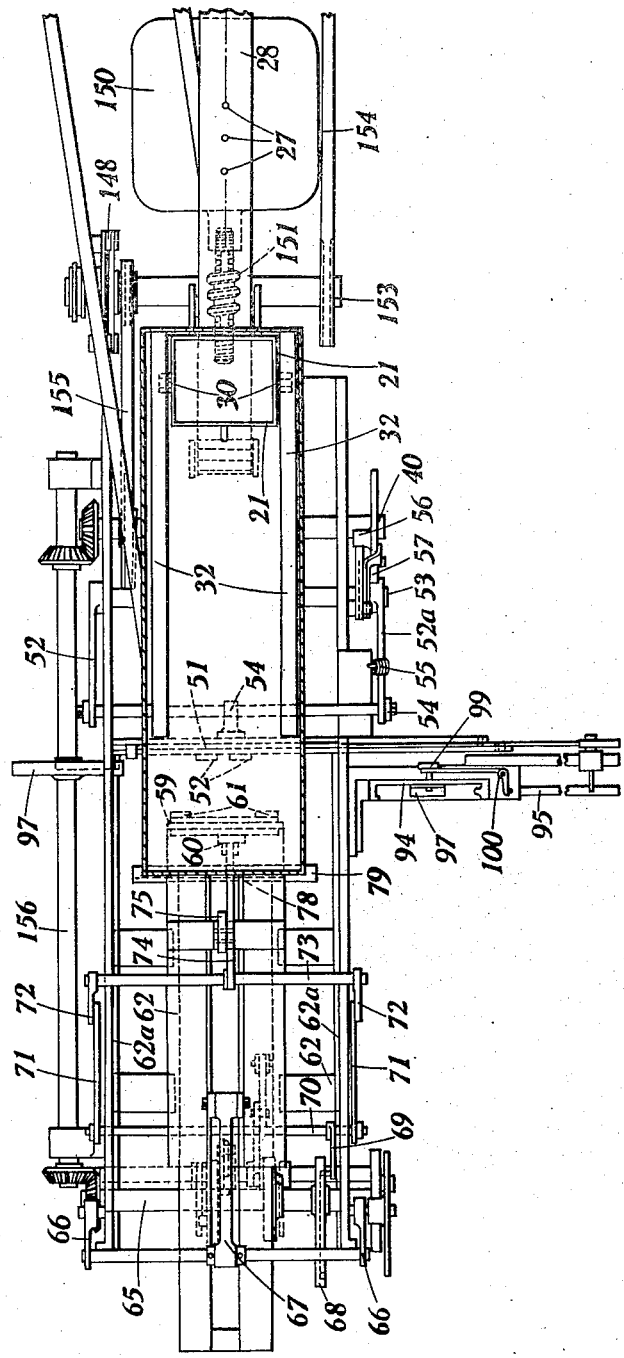
Figure 2 is a plan of that portion of the machine shown in Figure 1A.

Referring to Figures 1-2, the machine comprises a hopper 12 into which chips, either cooked or uncooked, are thrown. These chips fall to the bottom 13 of this hopper and from there may be picked up by spaced plates on the conveyor 14 that deliver them into a container adapted to be heated, such as the tank 15 containing oil or fat. The form of conveyor here illustrated is of a convenient and conventional type, but the invention herein claimed is not limited to this showing in the drawings. The oil tank may be provided with a perforated false bottom 16 on which the chips rest. If the chips are supplied to the hopper 12 in the raw state then they are cooked in this tank 15 (which is supplied with suitable heating apparatus, not shown). If they are supplied to the hopper 12 already cooked or partially cooked, then they are warmed up or the cooking is finished in the tank 15. Above the cooking and/or heating tank 15 there is a conveyor 17 having spaced conveyor plates 18 and this conveyor, which travels in a clockwise direction, picks up the chips and carries them up the inclined and perforated wall 19, the oil meanwhile draining back through the perforations into the base of the tank. The mechanism for driving the conveyors 14 and 17 is not shown, since its specific nature is not a part of the present invention and may be varied within wide limits. Suffice it to say that these conveyors may be geared with some driven part of the apparatus, such as the shaft 153 or 40, in a manner to give the desired motions to them. As the chips reach the lip of this wall 19 they fall over into a hopper 20 whence they pass into a tub 21 that is positioned below it. This tub 21 rests upon a platform 22 and has at its front end a hook-shaped finger 23. The platform 22 is carried upon parallel pivoted links 24, 25 as in a balance or scale and the link 25 is provided with a balance weight 26, so that when the requisite quantity by weight of chips has accumulated in the tub 21, the latter sinks until the finger 23 is brought into engagement with any one of a number of perforations 27 in a travelling conveyor band 28. This conveyor band thereupon carries the tub upwards to a receptacle 29 (Figure 1B), which may comprise a heated storage oven.

Each tub is provided with wheels or runners 30 and, when the tub is delivered to the receptacle 29 such wheels or runners are received within opposed channel-shaped tracks 32, of a runway. This run-way is downwardly inclined towards a hopper 33 at the front end of the receptacle 29, and the tub therefore runs down the incline until the finger 23 comes against a pivoted catch 34. Figure 1B shows in dotted lines a tub held in the run-way by this catch.

The catch 34 is carried upon a pivoted lever 35 connected to a rod 36 and is tripped at periodic intervals by the following mechanism. The rod 36 is drawn downwards by a tension spring 37 and carries at its lower end a roller 38 that cooperates with a cam 39 upon a cross shaft 40 in the base of the machine. There is a suitable recess 41 in this cam so that when the roller 38 drops into this recess, the catch 34 is moved out of the way of the finger 23 on the tub and permits this tub to run forward and downward over the curved nose of the run-way so that its contents are discharged through the hopper 33. The empty tub continues down the run-way until it is brought to rest (Figure 1A) by a pivoted stop 42 adjacent to the platform 22. When the platform 22 sinks with the weight of a full tub it closes contacts 43, 44 to complete a circuit through a solenoid 45 by means of which the stop 42 is drawn downwards against the weight 46 to free the aforesaid empty tub and to permit it to run on to the platform as the previous tub is removed therefrom by the conveyor belt 27.

It will be appreciated that the tubs 21, after discharging their contents down the hopper 33 from the oven or chamber 29 are in an inverted position, and in order to return same to the normal position, a pair of arms 169 may be located beneath the downwardly inclined run-way formed by the tracks 32, with which arms a pin or lug 170 projecting from each of the tub sides engages as the inverted tub travels down the run-way. The sharp contact between the pins 170 and arms 169 swings the tub over on its wheels or runners 30, and when the tub is the right way up it is prevented from swinging further by a centre plate or rail 171 preferably chamfered as shown and positioned between the tracks 32.

Other means may, however, be provided for returning the tubs to the normal position after tipping.

Turning now to the mechanism by which the cooked or reheated chips thus discharged into the hopper 33 are packed, in that portion of the machine that is shown in Figure 1B there is a platform 47 upon which a stack of bags is placed, mouths uppermost. These bags, which are indicated at 47a, are pressed or fed forwards by a plate 48 that is moved by a weight 49. The foremost bag of the stack is positioned almost directly below a plate 50 forming one wall of a chute 50a leading from beneath the hopper 33 and is arranged to be opened by bag-opening fingers 52, 61. Slidably mounted on this wall 50 there is a slider 51 carrying two of the bag-opening fingers 52; this slider is reciprocated vertically through the medium of a lever 52a pivoted at 53, connecting rod 54, and a tension spring 55, but is normally held in the raised position, together with the fingers 52, by spring 55. A pin 56 on one side of a rotating disc 40a on the cross shaft 40 coacts with the upper end of the lever 52a to rock or pivot said lever on the pivot 53 and draw down the slider 51 with fingers 52 against the spring 55 and when so operated a gravity catch 57 falls into engagement with a recess 52b to retain the lever 52a in the displaced position and the slider 51 lowered; it being understood that the fingers 52 when lowered enter the foremost of the bags 47a.

The other side of the chute 50a that forms a continuation of the hopper 33 is constituted by a plate 59 on which a slider 60, carrying the other two bag-opening fingers 61, is slidably mounted. This plate 59 actually forms the vertical side or part of a member which is angle or L-shaped in side elevation, the horizontal or foot portion 62 of it being movable horizontally in guides on the machine frame or other fixed part to bring the fingers 61 close to the fingers 52. The horizontal movements of the plate are controlled by means of a pin 63 carried upon a disc 64 on a cross shaft 65, which pin engages with the forked end of a pivoted lever 66, the latter being coupled by a connecting rod 67 to the part 62. The vertical movements of the slider 60 and the fingers 61 carried thereby are controlled as follows:—On the cross shaft 65 there is a cam plate 68, (Figures 1B and 2), the face of which is cut with a groove in which a pin on the end of a lever 69 engages. This lever is fixed to a transverse spindle 70 that at its opposed ends carries levers 71; the latter are connected by links 72 to a further transverse spindle 73 in the centre of the length of which there is a lever 74 pivoted upon a rocking link 75 and connected to the slider 60.

On the underside of the part 62 there is a spring arm 76 that, when the part 62 is pushed forwards, is moved against a projection 77 on the underside of the vertical plate 50 and is thereby deflected so that it enters the mouth of the foremost bag and partially opens it. In order to facilitate the opening, the forward edge of the bag mouth is lower than the other. It will, of course, be appreciated that the part 62 is advanced towards the bag while the slider 60 is in its raised position (as is also the slider 51). The sliders 51 and 60 are then lowered so that the fingers 52 and 61 are inserted in the partially opened bag. Next, the part 62 is retracted so that the fingers 61 are drawn away from the fingers 52, and the bag 166 thereby completely opened.

The mechanism is so timed that the measured quantity of chips is not discharged down through the hopper 33 until the bag positioned below it has been opened to receive it.

At the appropriate moment a second pin 58 on the opposite side of the disc 40a engages an extension of the catch 57 and knocks same out of engagement with the recess 52b in lever 52a so as to permit the spring 55 to raise the slider 51 and fingers 52. The fingers 52 are thus raised clear of the bag, but before the other fingers 61 are raised they are first moved horizontally to draw the filled bag into line with mechanism which now operates to close and seal the mouth of the bag. Such mechanism comprises dies 78 and 79 (Figures 4, 5, and 14), the die 79 being carried upon an arm 80 that is formed on its undersurface with a ramp 81 and is pivoted to a block 82. The block 82 is connected to the upper end of a lever 83 pivoted at 84 and movable by means of a pin 85 on a disc 86 that is mounted on the cross-shaft 65. By these means the die is advanced towards the bag mouth. In its advance the ramp 81 on the arm 80 moves over a roller 87 so that the die 79 is raised over the bag mouth and is then permitted to drop down on the far, i. e. rear side of the bag.

Figures 6, 7:
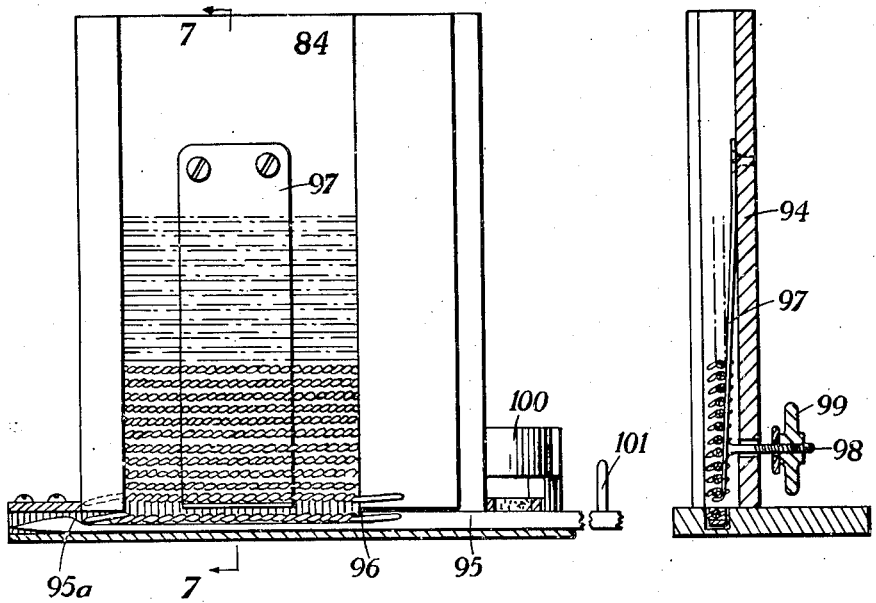
Figure 6 is a sectional elevation of part of the mechanism for closing and securing the mouths of the packages or bags in which the chips are delivered.
Figure 7 is a part-sectional elevation taken on the line 7—7 in Figure 6.
Figure 8:
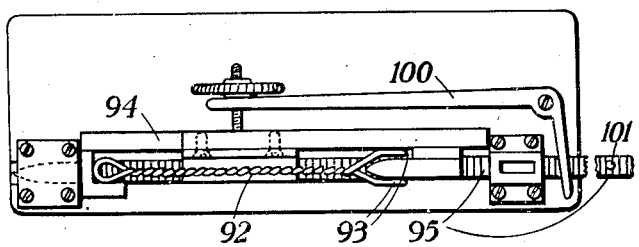
Figure 8 is a plan of Figure 6.
Figure 9:
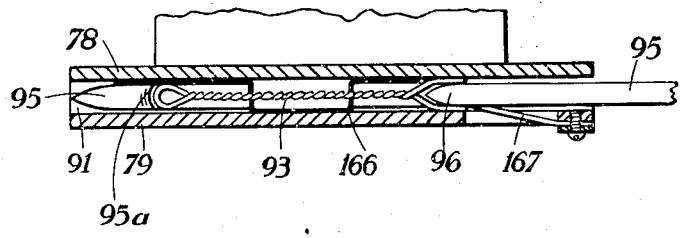
Figure 9 is a sectional plan through bag-closing dies which constitute a continuation of the bag-closing and securing mechanism shown in Figures 6, 7, and 8.

Immediately thereafter, the die 78 is moved by a lever 88 and a pin 89 upon a disc 90 also on the cross-shaft 65, (Figure 4). The bag mouth is gripped between these dies and the two walls of said bag are pressed together. In plan, however, the co-operating faces of the two dies 78, 79 are not straight, the die 78 being formed with projections 78a and the die 79 having a cooperating recess 79a so that the walls of the bag adjacent to the bag mouth are corrugated to correspond; see Figure 14. This permits a skewer to be stuck through the walls of the bag so that it transfixes them from one side to the other and then back again. The dies are each provided with a recess 91 extending the entire length to facilitate this skewering operation. The apparatus by which the skewers are forced through the bag mouth is shown in Figures 6, 7, and 8. Each skewer 92 consists of a length of wire which is bent and twisted to the shape shown in Figure 9, that is to say the skewer has at its forward end a loop and at its rear end a fork formed by the ends 93 of the wire, and such a skewer may be used as a fork in eating the chips. A supply of these skewers is carried in a magazine 94, where they lie horizontally one on top of the other. Beneath the magazine there is a horizontal reciprocatable bag-piercing needle 95. This needle is cut longitudinally with a recess as is shown in Figure 7 to accommodate a skewer, the forward end of said recess being chamfered as at 95a, and at the rear end of this recess there is a nose 96 that fits inside the fork 93 of the skewer. The needle is pushed forwards from the base of the magazine by means of levers worked from a cam 97a on a shaft 156 (Fig. 1B) and in its forward movement it carries the skewer with it. It passes through the slots 91 in the dies 78, 79 and transfixes the walls of the bag 166 adjacent to the mouth from side to side. The needle 95 is then retired, but upon its backward movement a light spring 167 fixed to the front die 79 coacts with the rear bifurcated end of the skewer 93 and prevents the return or withdrawal of said skewer so that the latter holds the bag mouth closed when the bag is subsequently released by the dies.

The skewers 92 in the magazine 94 are supported upon a lip at the bottom of a spring plate 97. Attached to this plate there is a screw 98 that extends through the wall of the magazine and at its outer end is provided with a knurled nut 99. This screw 98, between the wall of the magazine and the nut 99, is engaged by the end of a bell crank lever 100. The other end of this bell crank lever is positioned in the path of a small vertical pin 101 on the needle 95 so that as the needle moves forward the bell crank lever 100 is rocked and the plate 97 drawn sideways to release the skewers in the magazine. These skewers therefore fall on to the top of the needle. As the needle is retracted, after the bag has been pierced, the lip on the plate 97 moves beneath the bottom skewer but one, while the bottom skewer itself falls into the recess in the needle for use in the next cycle of operations in the machine.

After the bag has been thus sealed the die 78 is then retired by means of pin 102 on the disc 90, which pin makes contact with a lever 103, and the die 79 is retired by a similar arrangement of pin 104 on disk 86 and lever 105. As it is retired the die 79 is lifted over the bag mouth by means of the ramp 81 and roller 87.

Figure 3:
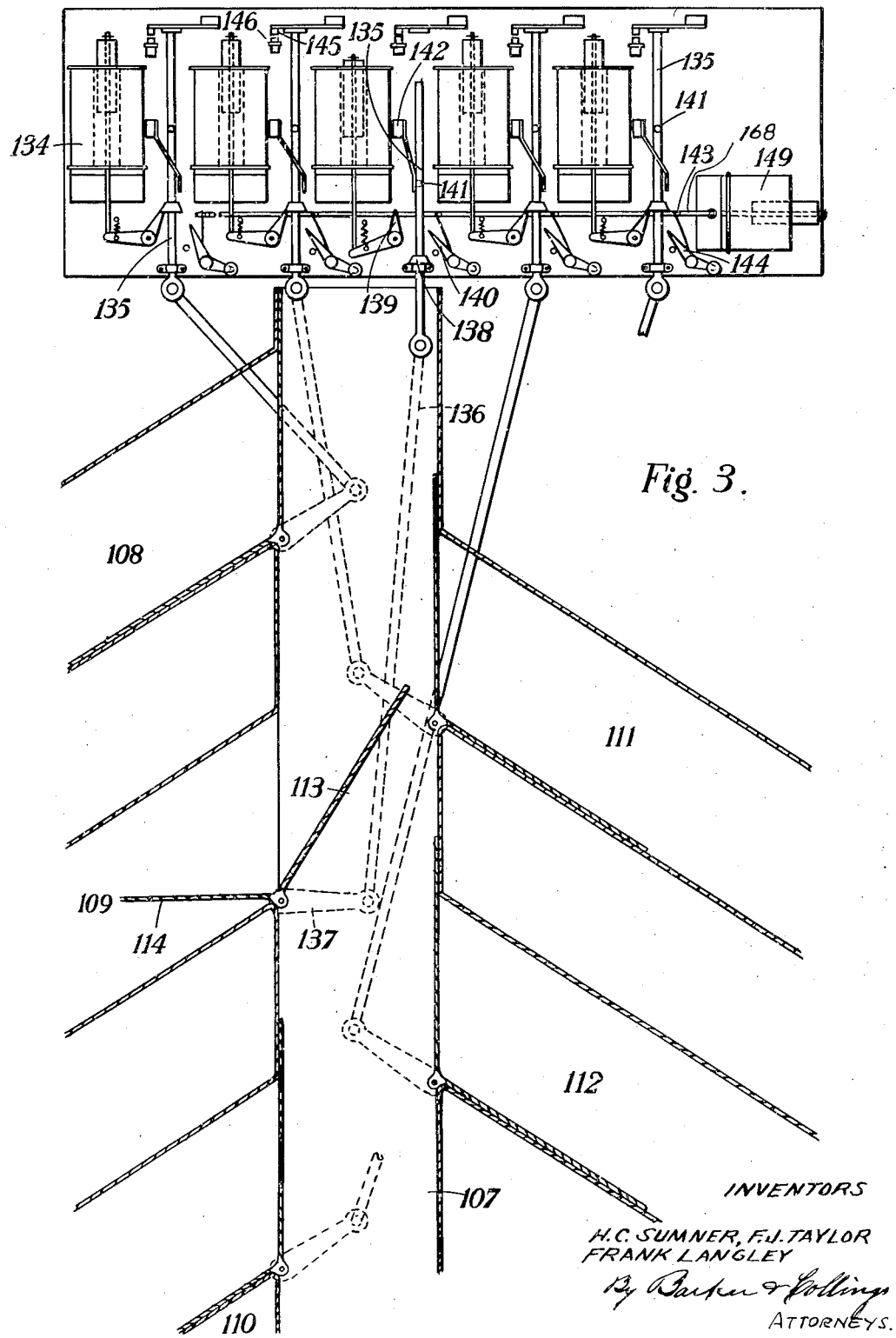
Figure 3 is a part-sectional elevation of a further portion of the machine showing delivery chutes and electro-magnetic locking mechanism.

The filled bag then falls from the plate 47 on which it has so far been supported through trap doors 106 into a vertical chute 107 (Figs. 1B and 3). The operation of these trap doors may be automatically controlled through mechanism operated from a suitable shaft, as 40; but as the specific nature of this control is not essential to the present invention it is not illustrated.

The vending machine shown in the drawings is provided with a number of coin slots 115 at different positions (of which two are indicated in Figure 1B) and it is, therefore, necessary to deliver a bag of chips to that position where the person has inserted his coins and not to any other position. For this reason subsidiary chutes, numbered 108 to 112, lead off from the vertical chute 107, one to each vending position. At the mouth of each subsidiary chute there is a hinged trap door 113 arranged to cover the chute. In Figure 3, the trap door appropriate to the subsidiary chute 109 is shown opened so that a package falling down the main chute 107 will be deflected by the door 113 into the chute 109 where it thereupon strikes a flap 114 that is connected to the trap door 113 and thus closes the latter. The obtuse angle between the trap door 113 and its associated flap 114 is approximately the same as the obtuse angle between the main chute 107 and the subsidiary chutes.

It is, of course, necessary to provide that no two trap doors shall be open at the same time and suitable apparatus whereby this is ensured is shown on Figures 3, 15, and 16. Referring particularly to Figure 15, there is at each vending position a coin slot 115 leading to a vertical coin chute 116 and an inclined branch coin chute 117, both of which communicate with a money receptacle 118. Just below the junction of the two chutes there is a pivoted lever 119 having at its lower end a hook 120 that projects across the chute 116. The machine is arranged to deliver a packet upon the receipt of two coins, and the first coin that is pushed through the slot 115 falls down and rests upon the end 120 of the lever 119. The second coin strikes the top of this first coin and is deflected thereby down the branch chute 117, where it makes contact with an arm 121 pivoted at 122 and in so doing establishes electrical contact between this arm and the chute 117 to complete an electrical circuit through a solenoid 123.

Connected to the arm 121 there is a spring arm 124 that is maintained in engagement with a contact 125 from which a lead extends to the solenoid 123. From the core of the solenoid a rod 126 extends to the end of a pivoted lever 127 that has at its other end a balance weight 128. When the solenoid 123 is energized the core is sucked down and the lever 127 is rocked against the weight 128. This movement is communicated by means of hook 129 and arm 130 to that arm 121 against which the coin rests, which arm 121 is thereby moved sufficiently to permit the coin to slide past it down to the receptacle 118, and the circuit through the solenoid is thus broken. The weighted end of the lever 127 is connected by a connecting rod 131 to the lever 119 and this same movement therefore serves to rock the lever 119 and thus the first coin is permitted to fall down the chute 116 to the receptacle 118. The various parts are then returned to their original positions by the weight 128.

If for any reason it is desired to prevent the insertion of coins, means are provided whereby the attendant may obstruct the slot 115. For example, there may be a pivoted arm 132 normally held in a position clear of the slot but which, when a chain 133 or the like is pulled by the attendant, is moved across the slot to obstruct it.

The closing of the circuit through the solenoid 123 also closes a circuit through a solenoid 134 operation of which serves to prepare the appropriate subsidiary chute to deliver the package to the corresponding vending position, and also serves indirectly to block all the other subsidiary chutes. As is shown in Figure 3, there is a solenoid 134 for each coin inserting (or vending) position and for each of the subsidiary chutes 108 to 112. Adjacent to each solenoid 134 there is a vertical spindle 135 connected by a link 136 and arm 137 to the appropriate trap 113. This vertical spindle carries a collar 138, arranged to co-operate with catches 139 and 140, and a pin 141 arranged to co-operate with a spring contact 142. When by the insertion of coins at any coin slot 115 the appropriate solenoids 123 and 134 are energized, one of the catches 139 is moved by that solenoid 134 to an inoperative position so that the adjacent spindle 135 falls by gravity and thereby opens one of the traps 113 so that a packet of chips is delivered down that subsidiary delivery chute that is appropriate to the vending position at which the coins were inserted. As the spindle 135 falls the pin 141 on it makes contact with the spring contact 142 and thereby closes the circuit through a common solenoid 149, the core of that solenoid being thereby moved towards the left. It is this movement that locks all the other subsidiary delivery chutes, because the catches 140 are thereby placed under the collars 138 of the remaining trap-operating rods 135, so that these rods cannot fall to open their trap-doors even if one of the other solenoids 134 (appropriate to another vending position) is energized. In order to bias the catches 140 to positions in which they will prevent the descent of the associated rods 135 there is a horizontal slidable shaft 168 attached to the plunger of the common solenoid 149 and carrying as many spaced pins 143 as there are catches 140, each of which pins engages with a leaf-spring 144 projecting from the associated catch. Thus when the shaft 168 is moved to the left upon energization of the solenoid 149 (following the insertion of a coin) the descent of one of all the springs 144 are deflected to set the catches 140, which incidentally are weighted so that when the solenoid 149 is subsequently de-energized and the shaft 168 moved to the right they rock to their inoperative positions. The said solenoid 149 is of course de-energized when the package, having passed into the appropriate delivery chute, depresses the flap 114 to raise the associated rod 135 and thereby break contacts 141, 142.

In addition to opening the required subsidiary chute, the energizing of a solenoid 134 and the descent of the associated rod 135 also serves to start the bag-filling and sealing apparatus. It will also be observed that the top end of each rod or spindle 135 bears, when that spindle is in its raised position, against a spring contact 145 and holds the latter away from a stationary contact 146. When any spindle 135 is permitted to fall by the energization of its appropriate solenoid 134, the contact 145 associated with that spindle moves against the co-operating contact 146 and thereby closes a circuit through a further solenoid 147. This solenoid completes a circuit from the mains through an electro-magnetic clutch 148 and thereby starts the before-described bag filling and sealing apparatus to deliver a bag of chips.

In the modified construction of apparatus illustrated in Figure 16, the first coin which is inserted through the slot 115 falls down the vertical coin chute 116 and comes to rest on a pivoted hook 172. In falling the coin comes into engagement with the tail portion 173 of a freely pivoted pawl 174 so as to swing said pawl on its pivot and bring an inclined tip 175 into a position at the junction between the vertical delivery chute 116 and an inclined branch chute 117, as indicated in dotted lines in Figure 16. In this position the tip 175 of the pawl 174 deflects the next inserted coin down the branch chute 117 where it falls on the extremity of a comparatively long lever 176 and depresses said lever until the coin falls clear of the chute 117. The lever 176 is pivoted at 177 and attached to this pivot is an insulated block 178 carrying a spring-bridge contact member 179 which on depression of the lever 176 by the coin makes contact with a pair of spaced contacts 180 and in so doing completes the circuit of the appropriate solenoid 134. The pivot 177 also carries a catch 181 which on depression of the lever 176 coacts with a pivoted pawl 182. This serves to hold the contacts 179 and 180 in engagement until delivery is given of the goods, after which through the medium of a rod 183 (which is suitably coupled to the appropriate one of the rods 135 shown in Figure 3) pivoted bell crank lever 184 and hooked link 185 coacting with pin 186, the said pawl 182 is pulled forward out of engagement with the catch 181.

When the lever 176 has been depressed by a second inserted coin, the first inserted coin is released from the hook 172 by means of an arm or lever 187 and coupling rod or link 188 extending from said arm 187 to the hook 172, and when the hook 172 is swung out of the chute 116 and the coin falls, the pivoted pawl 174 is swung back by gravity to its normal position with the tail portion 173 projecting through said chute 116 and the tip 175 withdrawn from said chute. After delivery of the goods and the disengagement of the catch 181 on pivot 177 from the pawl 182, a counter-weight 189 raises the lever 176 to its normal position and disengages the contacts 179 and 180.

Whichever of the two illustrated constructions is adopted, as stated previously, the bag of chips is deflected by the opened trap door 113 down the appropriate one of the subsidiary delivery chutes 108 to 112. In its passage into such subsidiary chute, it presses down a flap 114 and thereby closes the trap door and also moves the associated spindle 135 upwards. The upward movement of this spindle breaks the contact at 141 and 142 and the circuit through the common solenoid 149 and thereby releases the spring pressure upon the catches 140. These catches thereupon move to their inoperative positions so that if by the insertion of coins at any other vending position a solenoid 134 is energized then the trap door 113 appropriate to that solenoid and to that vending position may be opened.

When a spindle 135 reaches its upper position it is held by the associated catch 139. On reaching such upper position it breaks the contacts 145 and 146 and the circuit through the solenoid 147 thereby freeing the electro-magnetic clutch 148 to bring the machine to a stand still.

The machine is driven from a continuously rotating electric motor 150. This motor drives, by means of a worm 151 and a worm wheel 152, a cross shaft 153 upon which the electro-magnetic clutch 148 is mounted. From this cross shaft a belt 154 extends backwardly to drive the continuously moving perforated conveyor 28. A further belt 155 extends forwardly to drive the cross shaft 40 and it is this belt 155 that is started and stopped by the electro-magnetic clutch 148. The two cross shafts 40 and 65 are connected by bevel gearing and by a longitudinal shaft 156.

From the foregoing description, it will be appreciated that the insertion of coins into a coin slot 115 at any of the vending positions places in train the mechanism shown in Figure 3, to prepare the delivery chutes to deliver a package only to that position and then starts the machine working (by the electro-magnetic clutch 148) to pack and deliver a measured quantity of chips.

The conveyors 14 and 17 may be intermittently driven through any suitable drive transmission from the cross shaft 153 or other convenient motion shaft of the machine, or they may be driven and controlled independently of the packing and delivery mechanism. In cases where the conveyors 14 and 17 are independently operated, the insertion of a coin or coins operates to withdraw the chips from the oven or heated chamber 29 wherein a stock may be maintained.

It may sometimes be desirable to construct the machine so that every so often it returns money or delivers a suitable check or token to the purchaser of the packet of chips. For this purpose adjacent to the receptacle 29 (Figure 1B) there is a magazine 157 for coins or tokens, having in its base an outlet slot 158 in line with an opening 159 in the wall of said receptacle 29 above the chute 33. Below this magazine there is a ratchet wheel 160 carrying a finger 161. This ratchet wheel is stepped round by means of a pawl 162, bell crank lever 163 and a push rod 164 that is oscillated from a cam 165 on the longitudinal shaft 156. Once in each revolution of the ratchet wheel 160, the finger 161 passes through the bottom of the magazine 157 and sweeps out one or two coins (the number of coins of course depending on the height of the finger) so that they fall down the chute 33 and are packed into a packet of chips.

We claim:—

1. In a goods vending apparatus having a plurality of purchasing stations, the combination of a store for a mass of vendible goods, a plurality of delivery tracks leading one to each station and arranged to receive and direct the purchased goods, mechanism adapted to withdraw goods from the mass in the store and prepare the same for delivery, and means operable when a purchase is made at any station to set the tracks for delivery to that station only and also to set into operation the mechanism for withdrawing and preparing the quantity of goods so purchased.

2. In an apparatus for vending loose goods having a plurality of purchasing stations, the combination of a store for a mass of the goods, a plurality of delivery tracks leading one to each station and arranged to receive and direct the purchased goods, mechanism adapted to withdraw from the mass successive quantities of the goods as purchases are made and for packaging the same, and means operable when a purchase is made at any station to set the tracks for delivery to that station and also to set into operation the mechanism for withdrawing and packaging the quantity of goods so purchased.

3. In a vending machine the combination of a store for goods, means for discharging goods therefrom into containers at a weighing station, a scale at the latter, containers and means to position them in succession on the scale to receive the goods, a conveyor for engaging and transporting each filled container, as the scale is deflected by it, to a packing station, packing mechanism thereat and means for discharging the contents of the containers into receiving containers to be operated upon by said mechanism.

4. In a vending machine, the combination of a store for goods, a series of containers, a balance, means for positioning each container on said balance and means for loading the container so positioned with goods from the store whereby said balance is deflected, a conveyor operable upon such deflection to engage the container and to transport it to a packing station, packing means at said station for packing the contents of the containers, and means for causing each container to discharge into said packing means as it is brought to said station.

5. In a vending machine, the combination of a store for goods, a series of containers, a balance, means for positioning each container on said balance and means for loading the container so positioned with goods from the store whereby said balance is deflected, a conveyor operable upon such deflection to engage the container and to transport it to a packing station, means for feeding receptacles in succession to said packing station, means for causing each container to discharge its contents into a receptacle thus supplied, means for closing and sealing the filled receptacle, and means to cause the machine to deliver a filled receptacle.

6. In a vending machine for edible products, the combination of a container adapted to be heated, means for supplying eatables thereto and for removing them therefrom, devices for measuring said eatables into batches and for transporting the batches to a packing station, means at said station for inserting the batches into separate bags and for sealing said bags, and means for causing the mechanism at said station to operate.

7. In a vending machine for dispensing edible goods, the combination of a container adapted to be heated for heating said goods, a storage oven for batches removed from said container, means for conveying batches of the goods from the container to the oven said means comprising a deflectable balance, tubs, means for positioning a tub on said balance, means for filling said tub with a batch withdrawn from the container so that the balance sinks, and a conveyor running between the balance and the storage oven and operable to take the filled tub from the deflected balance and to transport it to the storage oven and to place it upon a return track, means operable upon the removal of one tub from the balance to permit another to be positioned thereon, a return track for the tubs running from the oven back to the balance, said track being shaped to cause a tub placed at its oven-end to discharge its contents, a releasable catch for temporarily restraining said tub against discharge, a chute for collecting the goods thus discharged and directing them into the interior of a bag, mechanism for positioning a bag to collect the goods and for closing and sealing said bag, and devices for releasing said catch to discharge the contents of one tub and for causing the bag closing and sealing devices to operate upon the one bag thus filled.

8. In an apparatus such as described, a store for a mass of loose goods, means for conveying the goods from said store, a receptacle arranged to receive the goods so conveyed, a weighing mechanism on which the receptacle is set and movable when the desired amount of goods have been deposited in the receptacle, a conveyor leading away from the weighing mechanism, a projecting part carried by the receptacle arranged to engage with the conveyor when the weighing mechanism is depressed and thus cause the receptacle to be moved with the conveyor, and means for causing discharge of the receptacle when it has reached the desired position.

9. An apparatus such as described in claim 8, including also, means for receiving and operating upon the contents of the receptacle after discharge from the receptacle and prepare it for final delivery, and means to set into operation the last stated means arranged to be operated in timed relation with the discharge of the receptacle.

10. A machine such as herein described comprising in combination a store for a mass of loose goods to be vended, a container for the goods adapted to be heated, means for removing batches of the goods from the container successively and delivering them, means for measuring the said delivered batches, a conveyor for receiving and transporting the measured batches to a packing station, means at such station for receiving and packing the batches and delivering them successively, and means for causing the said parts to operate in the combination stated successively as determined by an operator.

H. C. SUMNER.
F. J. TAYLOR.
FRANK LANGLEY.